Sept. 13, 1927.   W. L. HARTZELL   1,642,494
INTERNAL COMBUSTION ENGINE
Filed Nov. 29, 1924
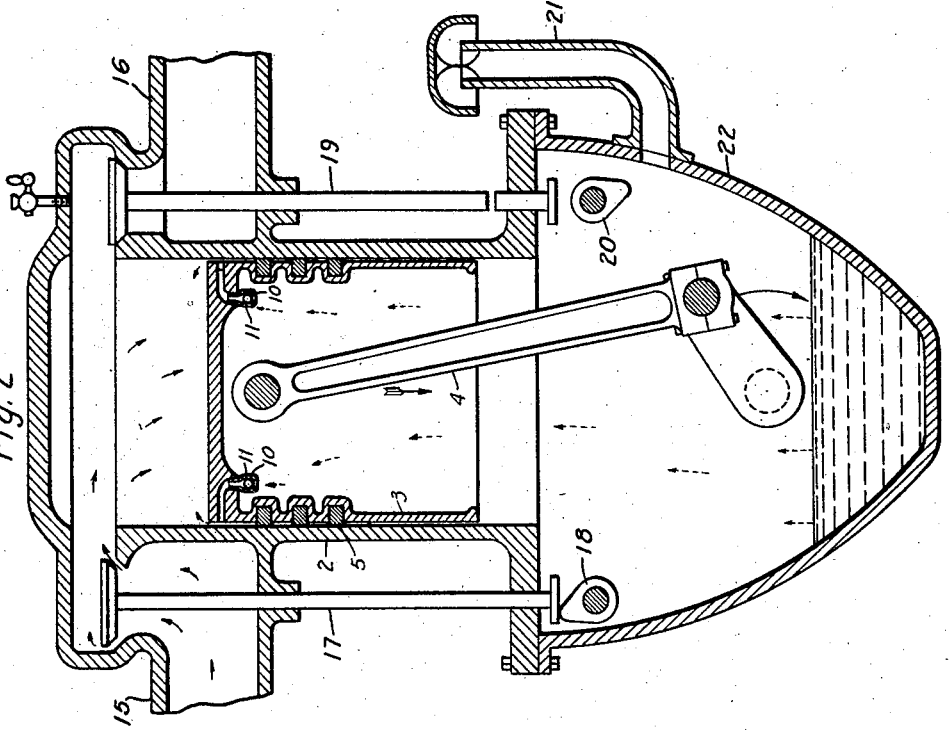
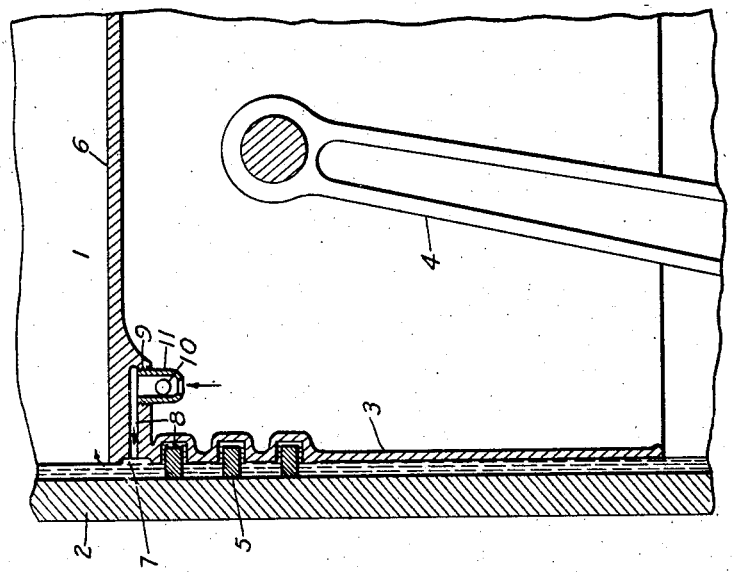
INVENTOR
Walter L. Hartzell
BY
William R. Coley
ATTORNEY Patented Sept. 13, 1927.

1,642,494

UNITED STATES PATENT OFFICE.

WALTER L. HARTZELL, OF EVANSTON, ILLINOIS.

INTERNAL-COMBUSTION ENGINE.

Application filed November 29, 1924. Serial No. 752,871.

My invention relates to internal-combustion engines and it has particular relation to means and methods of increasing the economy, improving the operation and increasing the life of the internal-combustion engine, such as is used in an automobile.

The so-called "pumping of oil" is a very common trouble that occurs in internal-combustion engines, especially those of the automobile type. The cause of this pumping action is that, on the suction stroke of the engine, a vacuum is formed in the combustion chamber, which vacuum effects the sucking up of oil, which has collected on the cylinder walls, into the combustion chamber proper. This oil, of course, burns much more slowly than the gasoline mixture and, furthermore, since there is not enough oxygen to support complete combustion, deposits of carbon occur.

For the above and other reasons, it is thus very desirable to prevent as much of this "oil pumping" as possible, and it is, therefore, the chief object of my invention to provide a relatively simple and inexpensive, but reliable and efficient, device for practically preventing this undesirable phenomenon.

More specially stated, it is the object of my invention to provide, in combination with a movable vacuum or suction-creating member, such as a piston, a valve device, or the like, that is automatically rendered active during the suction stroke of the piston to prevent the above-mentioned suction of oil along the walls of the cylinders into the combustion chamber proper.

Other and more specific objects of my invention, as outlined above, will become further evident from the following detailed description, taken in conjunction with the accompanying drawing, in which Figure 1 is a sectional view of a portion of an automobile engine constructed and arranged in accordance with my present invention; and Fig. 2 is a more complete sectional view of a T-head engine, indicating, by arrows, the flow of gasoline and oil vapor.

Referring to Fig. 1 of the drawing, the apparatus here shown comprises an internal-combustion engine, of which a combustion chamber 1, a cylinder wall 2, a piston 3 and a connecting rod 4, extending down into the usual crank case, are shown.

The cup-shaped piston 3 is provided with a set of the familiar piston rings 5 for tightly engaging the walls of the cylinder 2 during operating conditions. Near the top or head 6 of the piston 3, an annular groove 7 is provided, which communicates at one or more points, as desired, with one or a plurality of radial ducts 8, each terminating in a valve chamber 9. A movable ball, or other suitable valve member 10, is enclosed in a shell or cage 11 constituting the outer walls of the valve chamber 9. For the sake of simplicity, only one valve device is shown, although it will be understood that any suitable member may be employed.

The operation of my invention, in general, may be set forth as follows:—

The valve member 10 is adapted to open on the suction stroke of the piston, which is indicated by the arrow on the drawing, thus admitting air at atmospheric pressure from the crank case below the piston to the valve chamber 9, radial duct 8, annular groove 7 and thence to the combustion chamber 1. Since the air flowing from the annular groove 7 is at atmospheric pressure, no suction of the oil will take place along the cylinder walls below this point. In other words, the vacuum existing at the seal in the combustion chamber of prior types of engines is entirely prevented in my invention, wherein equal, because atmospheric, pressures are present, both along the walls of the piston and in the space just above the piston in the combustion chamber.

Consequently, no "oil pumping" can possibly occur and the excess of oil between the cylinder walls and the piston will be wiped down into the crank case by the piston rings.

It will be understood that, whereas the valve is opened, as illustrated, during the suction stroke of the piston, both because of its inertia and also by reason of the fact that the initial suction acts upon it, during the opposite stroke of the piston, the valve will be tightly closed and, thus, no deleterious effect upon the operation of the piston during its compression stroke will be obtained.

Fig. 2 shows in complete detail the flow of the gasoline and of the oil vapor on such down or suction stroke of the piston.

In addition to the engine parts illustrated in Fig. 1, the structure of Fig. 2 includes intake manifold 15, exhaust manifold 16, intake valve 17 and intake cam 18, exhaust valve 19 and exhaust cam 20, breather tube 21, and crank case 22 containing the body of lubricating oil.

The complete path of the gasoline mixture is shown by solid arrows, while the complete path of the oil vapor is indicated by dotted arrows.

I do not wish to be restricted to the specific structural details or arrangement of parts herein set forth, as various modifications thereof may be effected without departing from the spirit and scope of my invention. I desire, therefore, that only such limitations shall be imposed thereon as are indicated in the appended claims.

I claim as my invention:

1. The combination with a cylinder having lubricated walls, of a piston for operation therein and having an opening extending laterally through the piston near the closed end thereof, and a valve device interposed in said opening and adapted to automatically open in one direction of travel of said piston.

2. The combination with a cylinder having lubricated walls, of a piston for operation therein and having a laterally-disposed opening near one edge thereof, and a valve device interposed in said opening to permit the flow of air around said edge into the space behind said piston.

3. The combination with a cylinder having lubricated walls, of a piston for operation therein and having a peripheral groove communicating with the inside portion of the piston, and at least one outwardly venting valve device for automatically opening such communication to expel air during the suction stroke of the piston.

4. The combination with a cylinder having lubricated walls, of a hollow cylindrical piston for operation therein and having a peripheral groove near the top edge thereof and communicating with the air space within the piston, and at least one outwardly venting valve device carried in the piston head for automatically opening such communication during the downward stroke of the piston.

In testimony whereof, I have hereunto subscribed my name this twenty-second day of November, 1924.

WALTER L. HARTZELL.